Oct. 19, 1926. Re. 16,443

E. O. HICKS

PROCESS OF DISTILLING PETROLEUM

Original Filed April 17, 1920

Witness,
F. S. Mann

Inventor,
Enoch O. Hicks
By Frank L. Belknap Atty.

Reissued Oct. 19, 1926. Re. 16,443

UNITED STATES PATENT OFFICE.

ENOCH O. HICKS, OF ST. JOSEPH, MISSOURI, ASSIGNOR, BY MESNE ASSIGNMENTS, TO THE UNIVERSAL OIL PRODUCTS COMPANY, OF CHICAGO, ILLINOIS, A CORPORATION OF SOUTH DAKOTA.

PROCESS OF DISTILLING PETROLEUM.

Original No. 1,378,229, dated May 17, 1921, Serial No. 374,742, filed April 17, 1920. Application for reissue filed December 1, 1921. Serial No. 519,291.

My invention relates to improvements in the process of treating the high boiling point or residual portions and particularly the residue of the distillation of the paraffine group of petroleum after the lower boiling point distillates have been removed therefrom, for obtaining the maximum quantity of a low boiling point product of the same group or series, and do the same in the minimum period of time, without destroying the viscous nature of the treated petroleum. Further improvements are to combine steam with the highly heated vapors of petroleum, primarily for preventing ignition of said vapors and secondarily for assisting their movement through the vapor conducting devices used in the process.

Apparatus for the practice of my improved process is illustrated in the accompanying drawings, in which.

Figure 1:
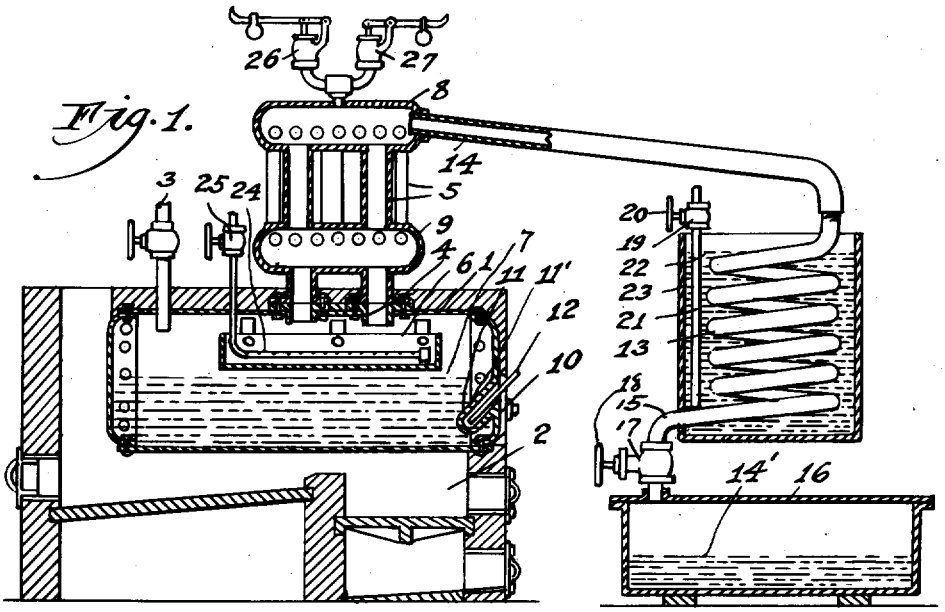
Fig. 1 is a side view of my preferred form of apparatus, certain parts being broken away.
Figure 2:
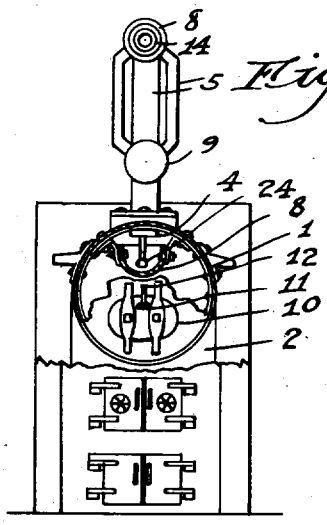
Fig. 2 is a front view of the vaporizing apparatus, shown in Fig. 1, certain parts being broken away.

Referring to Fig. 1, the vaporizer, or boiler 1 surmounts the fire chamber 2 and is provided with a closable liquid inlet pipe 3, through which pipe a quantity of hydrocarbon liquid, for treatment is forced into said boiler, from a source of liquid supply (not shown) after which said pipe is closed.

The pipes 4 are connected with the upper side of said boiler, for conducting vapor therefrom and for returning by gravity such parts of said vapor as are condensed in the air cooled condenser 5, the bottom of which condenser is connected with the upper ends of said pipes.

The revaporizer 6 is of trough shape and is detachably suspended in said boiler above the surface of the body of fluid 7, which is to be treated. Said revaporizer is beneath the lower ends of the pipes 4, for catching, and what is commonly called cracking and revaporizing therein, all of the condensed vapor, which gravitates from the condenser 5, through said pipes 4. Said condenser may be of any well known form for radiating heat therefrom, for cooling its contents, but is preferably formed of the upper and lower headers 8 and 9, respectively, which headers are connected by the radiating pipes 5.

Boiler 1 is provided with a manhole opening through its front end, which opening is closed by the manhole cover 10, with which the oil pocket 11 is formed. Said pocket is filled with oil 11′, for conducting heat to the thermometer tube 12, which indicates the temperature of the fluid 7.

The header 8, of the air cooled condenser 5, is connected with the liquid cooled condenser coil 13, by the pipe 14.

The low boiling point liquid product 14′ gravitates as a distillate, from the coil 13, through the pipe 15, into the tank 16.

Said pipe is provided with the automatically operated pressure retaining valve 17, which is adjusted for maintaining about from 4 to 5 atmospheres of pressure of vapor in said condensers and the boiler 1. The adjustment of said valve is accomplished by rotating the valve wheel 18. Since the structural details of said valve are old, they are neither shown nor described.

The relief valve 19 (provided with the hand wheel 20,) is connected with the upper end of the vertical pipe 21, the lower end of which pipe is connected with the lower end portion of the condenser coil 13, and is extended thereabove, through the cooling liquid 22, to a point above the top of the condenser tank 23, in which tank said liquid and coil are placed.

Said relief valve is manually opened from time to time for relieving the gas pressure, which is liable to accumulate in the coil 13 and obstruct the action of the apparatus.

In the process steam may be injected into the revaporizer 6, through the spray pipe 24, from an unshown source of steam under pressure, the flow of said steam being controlled by the valve 25.

The header 8 of the air cooled condenser is equipped with a pressure safety valve 26 and a vacuum safety valve 27, both of which are well known both in construction and operation, and are therefore neither shown nor described in detail.

In all of the conventional converting processes of this class, of which I am aware, a quantity of the previously described residual portions of petroleum is heated to a temperature of from about 650 to about 850 degrees F., under a pressure of from about 4 to about 5 atmospheres, thereby vaporizing the volatile portion of said petroleum. This vapor passes into an air cooled condenser, in which practically all of it is condensed and gravitates from said condenser into said heated petroleum, by the heat of which said condensed vapor is revaporized, or what is commonly called cracked, and is thereby converted into the vapor of a low boiling point product. The last mentioned vapor passes through said air cooled condenser, after which it is condensed, (under said pressure) in a liquid cooled condenser, into the low boiling point liquid product, which product is directed into a tank. The mixing of the condensed vapor with the heated petroleum, as above described, destroys the viscous nature of the latter, rendering the unevaporated portion of said petroleum unfit for use in lubricants, while my separate revaporizer 6 catches all of the liquid which gravitates from the air cooled condenser and revaporizes and cracks all of said liquid, separately from said heated petroleum; and herein lies my improvement in the previously described conventional processes. In my improved process the heated petroleum is not cooled by contact therewith of said returned liquid, but is thus kept at its high heat and is thereby distilled in the minimum period of time, without destroying any of its viscous nature. This maintained heat also vaporizes a greater volume of said petroleum, thereby producing a greater volume of the low boiling point product, than is produced by said conventional processes.

While I have shown and described the revaporizer 6, seen in Fig. 1, as being of trough shape, suspended in the boiler 1, above the heated petroleum 7, it is evident that revaporization could be done in variously formed devices, which perform their functions in the same manner, without in any way changing my improved process.

Figure 3:
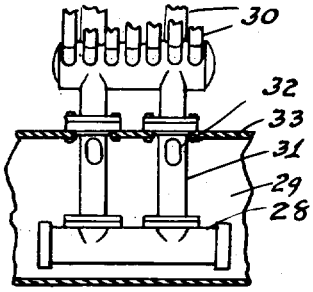
Fig. 3 is a side view of one of the other various forms in which the revaporizer may be constructed, certain parts being broken away.

One of such various forms of revaporizers is shown at 28, in Fig. 3. Said revaporizer is of cylindrical form, its ends being closed and is submerged in the heated petroleum 29.

Said revaporizer is connected with the bottom of the air cooled condenser 30, by the pipes 31, through the upper end portions of which the apertures 32 are formed, for passage therethrough into said pipes, of vapor arising from said heated petroleum, which is heated in the boiler 33, of which boiler and said radiator but portions are shown.

I claim as my invention:

1. The process of treating the liquid portions of the paraffin series of petroleum distillation having a boiling point upward of 500 degrees F. for obtaining therefrom low boiling point products of the same series, which consists of vaporizing the volatile constituent of said liquid portions of petroleum at a temperature of from about 650 to about 850 degrees F. in a still, condensing a portion of said vapors, revaporizing said condensed vapor while in said still while maintained above said liquid portions of petroleum, injecting steam into said revaporized vapor, recondensing said revaporized vapor, and maintaining a pressure of from about 4 to about 5 atmospheres on the liquids of said vapors throughout their course to and while undergoing condensation.

2. The process of treating the liquid portions of petroleum distillation having a boiling point upward of 500 degrees F. for obtaining therefrom low boiling point products of the same series, which consists of vaporizing the volatile constituent of said liquid portions of petroleum in a still at a temperature of 650 degrees F. or above, condensing a portion of said vapor, revaporizing said condensed vapor separately from said liquid portions of petroleum while within said still and while maintained in the vapor space of said still, recondensing said revaporized vapor and maintaining a pressure of 4 atmospheres or above on the liquids of said vapors.

3. The process of treating petroleum oil, which comprises distilling a body of oil in a still, in maintaining said oil under a superatmospheric pressure while subjected to a temperature exceeding 500° F., in discharging the vapors from the still to a reflux condenser, in condensing certain fractions of said vapors, in returning the reflux condensate from the condenser to a receiver disposed in the vapor space of said still, and in revaporizing said condensate in said receiver while maintained separate from the liquid oil in said still.

4. The process of treating liquid hydrocarbon oils, comprising introducing a supply of liquid oil to a still, in heating said oil to a cracking temperature while maintained under a superatmospheric pressure, in discharging vapors produced from said oil to a reflux condenser, in discharging uncondensed vapors from said condenser, in returning reflux condensate to an enlarged vessel suspended in said still and disposed in the vapor space thereof, from which vessel said condensate is re-evaporated while maintained separate from the body of oil in the still.

5. A process of treating hydrocarbon oil, consisting in heating oil to a cracking temperature in a still where a cracking heat is applied and in which still a vapor space is provided, in discharging vapors produced from the oil to a reflux condenser, in passing uncondensed vapors from said condenser, and in returning reflux condensate from the condenser to a receiver disposed in the vapor space of the still and where such condensate is retained and there re-evaporated by heat imparted thereto from the hydrocarbon materials in said still and is maintained out of physical contact with the liquid oil therein and in maintaining a superatmospheric pressure on the oil in said still.

ENOCH O. HICKS.